(12) United States Patent
Inaba (10) Patent No.: US 10,459,314 B2
(45) Date of Patent: Oct. 29, 2019

(54) DIGITAL CAMERA

(71) Applicant: Minoru Inaba, Oyama (JP)

(72) Inventor: Minoru Inaba, Oyama (JP)

( * ) Notice: Subject to any disclaimer, the term of this patent is extended or adjusted under 35 U.S.C. 154(b) by 4 days.

(21) Appl. No.: 15/774,732

(22) PCT Filed: Oct. 19, 2016

(86) PCT No.: PCT/JP2016/080924
§ 371 (c)(1),
(2) Date: Oct. 5, 2018

(87) PCT Pub. No.: WO2017/082005
PCT Pub. Date: May 18, 2017

(65) Prior Publication Data
US 2019/0025670 A1    Jan. 24, 2019

(30) Foreign Application Priority Data

Nov. 11, 2015   (JP) .................................. 2015-220965

(51) Int. Cl.
*G03B 13/02*  (2006.01)
*G03B 17/02*  (2006.01)
(Continued)

(52) U.S. Cl.
CPC ............ *G03B 13/02* (2013.01); *G03B 17/02* (2013.01); *G03B 17/04* (2013.01); *G03B 19/02* (2013.01);
(Continued)

(58) Field of Classification Search
None
See application file for complete search history.

(56) References Cited

U.S. PATENT DOCUMENTS 5,321,456 A * 6/1994 Yoon .................. H04N 5/23293
348/333.07
5,548,334 A * 8/1996 Ichiyoshi ............. H04N 5/2251
348/341
(Continued)

FOREIGN PATENT DOCUMENTS

JP     S62 61035     3/1987
JP     H04 49782     2/1992
(Continued)

OTHER PUBLICATIONS

International Search Report dated Dec. 27, 2016 in corresponding PCT application No. PCT/JP2016/080924, 2 pages.

*Primary Examiner* — William B Perkey
(74) *Attorney, Agent, or Firm* — Fattibene and Fattibene LLC; Paul A. Fattibene (57) ABSTRACT

A digital camera with which a captured image can be easily recognized through an electronic viewfinder regardless of whether the digital camera is oriented vertically or horizontally. A camera having an imaging lens, an electronic viewfinder to observe the image captured by the imaging lens, a guide mechanism guiding the vertical movement of the electronic viewfinder, and a biaxial rotation mechanism capable of causing the electronic viewfinder to rotate according to the vertical screen position or the horizontal screen position. The biaxial rotation mechanism is provided with a linking part linking the electronic viewfinder and the guide mechanism; a first shaft part for supporting the electronic viewfinder on the linking part so as to rotate in a first direction; and a second shaft part supporting the linking part on the guide mechanism so as to rotate in a second direction.

7 Claims, 8 Drawing Sheets

(51) Int. Cl.
  *G03B 17/04* (2006.01)
  *H04N 5/225* (2006.01)
  *H04N 5/232* (2006.01)
  *G03B 19/02* (2006.01)
(52) U.S. Cl.
  CPC ......... *H04N 5/225* (2013.01); *H04N 5/23293* (2013.01); *G03B 2213/02* (2013.01)

(56) References Cited

U.S. PATENT DOCUMENTS

| | | | |
|---|---|---|---|
| 7,202,901 B1 * | 4/2007 | Hattori | H04N 5/23293 348/333.06 |
| 2001/0005454 A1 * | 6/2001 | Nishino | H04M 1/0216 396/287 |
| 2014/0300791 A1 * | 10/2014 | Shirono | H04N 5/23293 348/333.01 |
| 2015/0029380 A1 * | 1/2015 | Noh | G03B 13/02 348/333.01 |
| 2018/0210316 A1 * | 7/2018 | Inaba | H04N 5/2253 |
| 2019/0025670 A1 * | 1/2019 | Inaba | G03B 13/02 |

FOREIGN PATENT DOCUMENTS

| | | |
|---|---|---|
| JP | 05 090093 U | 12/1993 |
| JP | H10-142666 | 5/1998 |
| JP | 2000 188704 | 7/2000 |
| JP | 2006 081216 | 3/2006 |
| JP | 2014 023075 | 2/2014 |

* cited by examiner

DIGITAL CAMERA

TECHNICAL FIELD

The present invention relates to a digital camera and, more particularly, a digital camera in which an electronic view finder can be vertically and horizontally rotated.

BACKGROUND ART

A conventional digital camera is rotated about an optical axis of an image-pickup lens depending on the size, direction, and the like of an object to selectively pick up an image at a vertical screen position or a horizontal screen position.

In a digital camera using an electronic view finder allowing a user to view an image to be picked up from an imaging lens, the user visually checks the image to be picked up through an eyepiece of the electronic view finder to perform photographing. In particular, when the display of the digital camera is difficult to be visually checked in the open air or the like, an image to be picked up is generally checked through an electronic view finder.

Patent Literature 1 discloses a digital camera including a finder which can be vertically moved with respect to a housing. When a user performs photographing by using this digital camera, the user presses a finder switch to cancel an engagement between a finder holding hook and a finder rear hook, so that the finder moves upward by a finder spring to a position where photographing can be performed. A stopper disposed in the housing positions the finder to a predetermined position. The user visually checks an object to be photographed through the finder and then presses a shutter switch to perform photographing.

PRIOR ART LITERATURE

Patent Literature

Patent Literature 1: Japanese Unexamined Patent Application Publication 10-142666

SUMMARY OF THE INVENTION

Problem to be Solved by the Invention

However, in the digital camera described above, a finder only vertically moves in longitudinal directions of the housing which is equal to biasing directions of the finder spring, copes with only photographing at a horizontal screen position, and does not cope with photographing at a vertical screen position disadvantageously.

Thus, a technical problem to be solved to easily check an image to be picked up by looking into the electronic view finder regardless of the vertical and horizontal directions of the digital camera has occurred. The present invention has an object to solve the problem.

Means for Solving the Problem

The present invention has been proposed to achieve the object, and an invention according to an embodiment provides a digital camera which has a camera body having an imaging lens and an electronic view finder which can be stored in the camera body such that the electronic view finder can be vertically moved and allows a user to observe an image to be picked up by the imaging lens, comprising a guide mechanism which guides vertical movement of the electronic view finder, and a biaxial rotation mechanism having a connecting part connecting the electronic view finder to the guide mechanism, a first shaft part supporting the electronic view finder such that the electronic view finder can be rotated in a first direction with respect to the connecting part, and a second shaft part supporting the guide mechanism such that the guide mechanism can be rotated in a second direction vertical to the first direction with respect to the first guide mechanism.

According to this configuration, the guide mechanism guides the vertical movement of the electronic view finder, and the biaxial rotation mechanism can arbitrarily rotate the electronic view finder around the first shaft part or the second shaft part. More specifically, the electronic view finder can cope with any one of a vertical screen position or a horizontal screen position. The connecting part rotates relatively in the second direction with respect to the guide mechanism to cause the electronic view finder to cope with the other of the vertical screen position and the horizontal screen position.

An invention according to another embodiment, in addition to the configuration of the digital camera according to a prior embodiment, provides a digital camera wherein the guide mechanism includes a support part connected to the electronic view finder through the connecting part, a cylindrical part storing the support part in a nesting structure such that the support part can be vertically moved, a positioning part which can position the support part depending on a storage position where the electronic view finder is stored in the camera body or a photographing position where the electronic view finder projects from the camera body.

According to this configuration, since the support part connected to the electronic view finder is stored in the cylindrical part in a nesting structure to suppress the support part from being displaced in a horizontal direction, the electronic view finder can be accurately vertically moved.

An invention according to another embodiment, in addition to the configuration of the digital camera according to a prior embodiment, provides a digital camera wherein the positioning part includes a first stopper groove carved in a peripheral surface of the support part depending on the storage position, a second stopper groove carved in the peripheral surface of the support part depending on the photographing position, and a stopper pin which can be engaged with the first stopper groove or the second stopper groove.

According to the configuration, the stopper pin is engaged with the first stopper groove or the second stopper groove to make it possible to arbitrarily position the electronic view finder at the storage position or the photographing position.

An invention according to another embodiment, in addition to the configuration of the digital camera according to any one of the other embodiments, provides a digital camera including a counter-rotation restriction part restricting counter rotation of the electronic view finder in the first direction.

According to the configuration, since the counter-rotation restriction part restricts the counter rotation of the electronic view finder, positional adjustment of the electronic view finder can be easily performed.

An invention according to another embodiment, in addition to the configuration of the digital camera according to any one of the other embodiments, provides a digital camera including an over-rotation restriction part restricting a rotation range of the connecting part in the second direction.

According to the configuration, since the over-rotation restriction part restricts the rotation range of the connecting part to suppress the connecting part from excessively rotating, positional adjustment of the electronic view finder can be easily performed.

An invention according to another embodiment, in addition to the configuration of the digital camera according to any one of the other embodiments, provides a digital camera wherein the connecting part including a vertical surface part in which a first hole into which the first shaft part is inserted is formed and which faces the electronic view finder and a horizontal surface part in which a second hole into which the second shaft part is inserted is formed and which faces the support part, the vertical surface part and the horizontal surface part being arranged in substantially an L shape.

According to the configuration, since the electronic view finder and the support part are arranged in parallel with each other in a planar view by using the connecting part formed in substantially an L shape to omit an installation space for a spring arranged below the electronic view finder as in a conventional technique, the camera body can be reduced in size.

Effect of the Invention

According to the present invention, the electronic view finder rotates relatively in the first direction with respect to the connecting part to make it possible to cause the electronic view finder to cope with any one of a vertical screen position or the horizontal screen position. The connecting part rotates relatively in the second direction with respect to the guide mechanism to make it possible to cause the electronic view finder to cope with the other of the vertical screen position and the horizontal screen position.

BRIEF DESCRIPTION OF THE DRAWINGS

FIGS. 4A and 4B are views showing a positioning part, in which

FIGS. 5A and 5B are pattern diagrams showing a manner of positioning the support part by a stopper pin, in which

DETAILED DESCRIPTION OF EMBODIMENT

In order to achieve an object that a user looks into an electronic view finder to easily checks an image to be picked up regardless of vertical and horizontal directions of a digital camera, the present invention produces a digital camera which includes a camera body having an imaging lens and an electronic view finder which can be stored in the camera body such that the electronic view finder can be vertically moved and which causes a user to observe an image to be picked up through the imaging lens, including a guide mechanism guiding vertical movement of the electronic view finder, and a biaxial rotation mechanism having a connecting part connecting the electronic view finder to the guide mechanism, a first shaft part supporting the electronic view finder such that the electronic view finder can be rotated around a first direction with respect to the connecting part, and a second shaft part supporting the connecting part such that the connecting part can be rotated around a second direction vertical to the first direction with respect to the guide mechanism.

Embodiment

Figure 1:
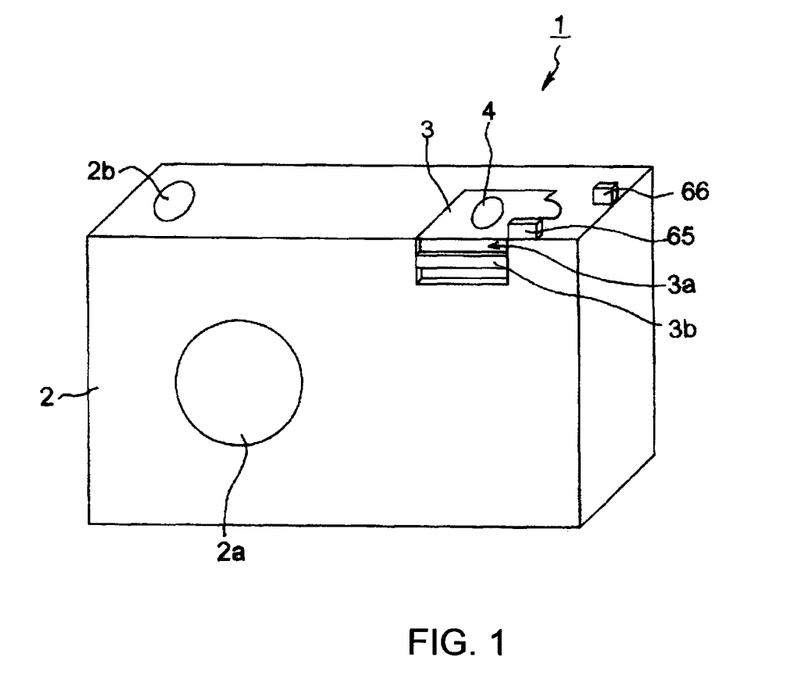
FIG. 1 is a perspective view showing a digital camera according to one embodiment of the present invention.
Figure 2:
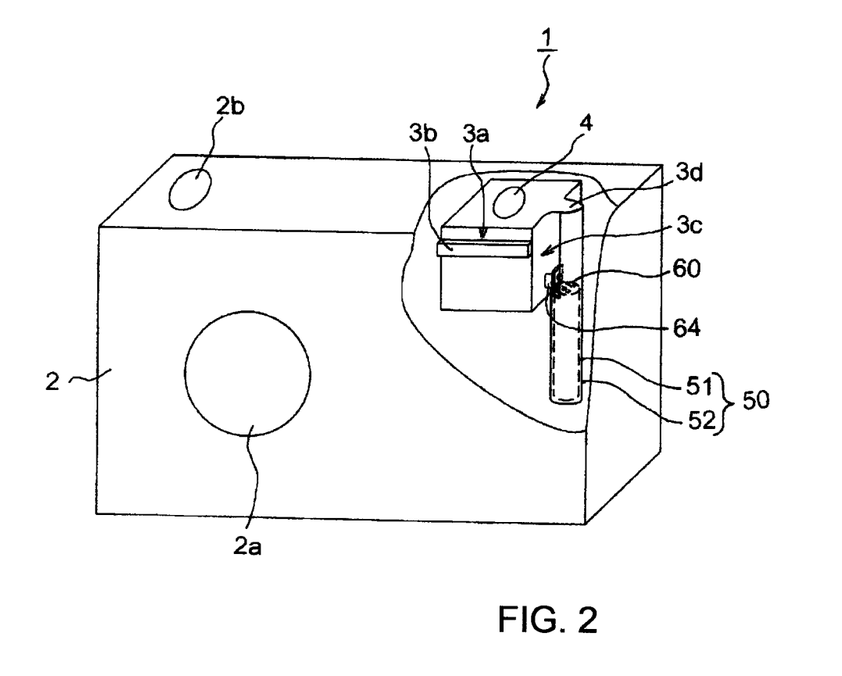
FIG. 2 is a partially cutaway side view of the digital camera.
Figure 3:
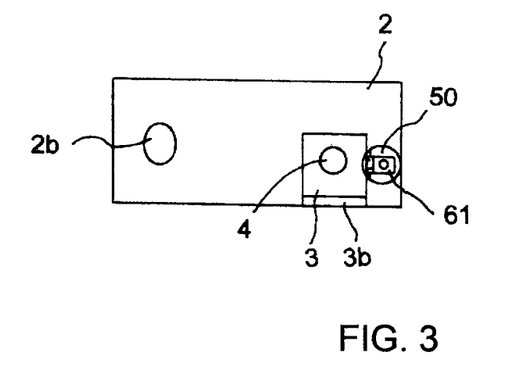
FIG. 3 is a plan view of the digital camera.
Figure 4A:
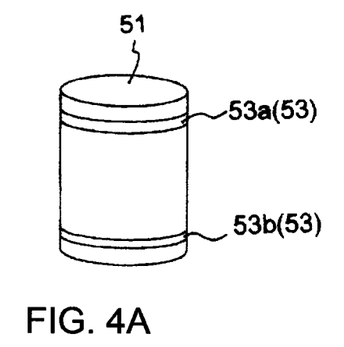
FIG. 4A is a perspective view showing a support part and FIG. 4B is a perspective view showing a cylindrical part.
Figure 4B:
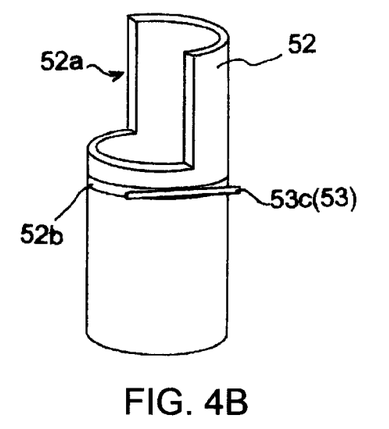
Figure 5A:
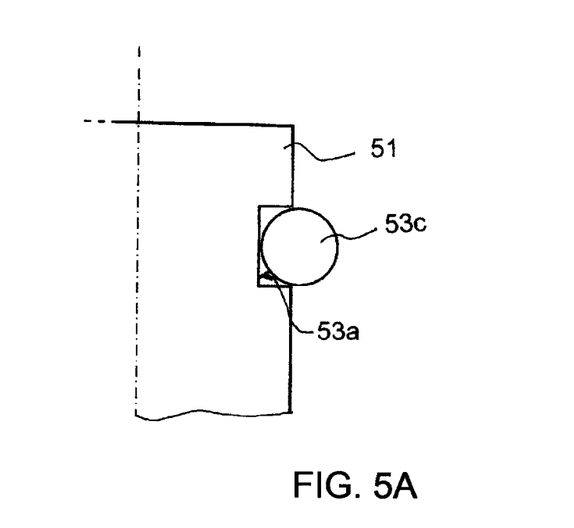
FIG. 5A is a side view showing a manner of engaging the stopper pin with a first stopper and FIG. 5B is a side view showing a manner of engaging the stopper pin with the second stopper groove.
Figure 5B:
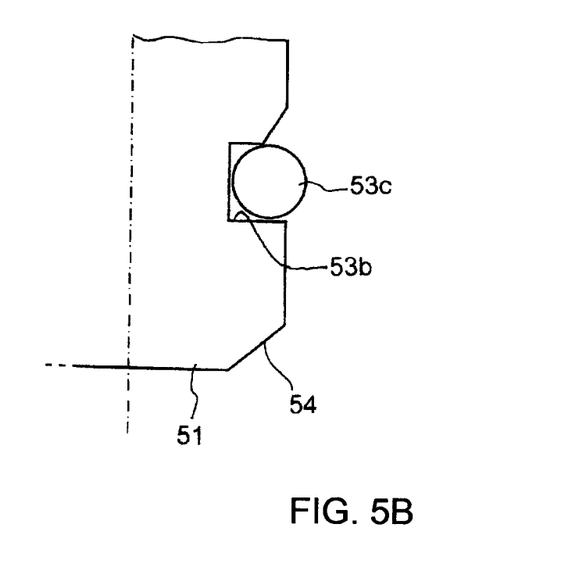
Figure 6:
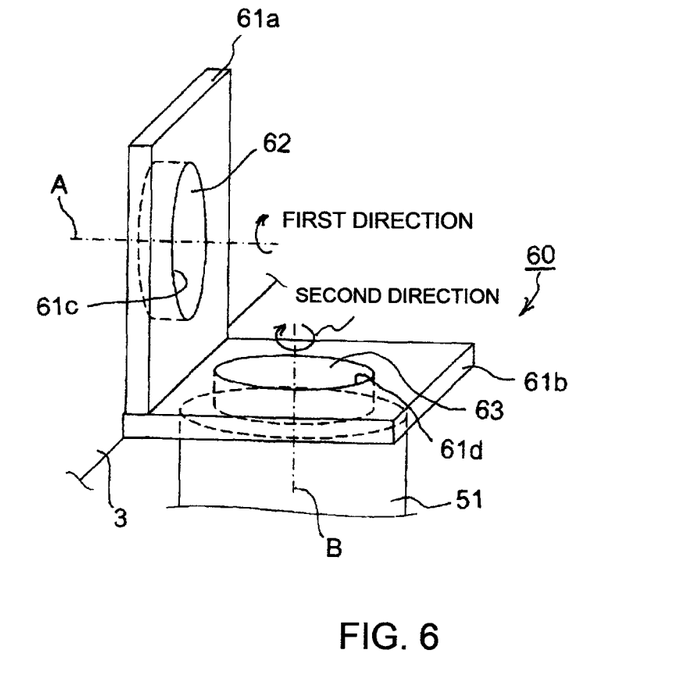
FIG. 6 is a perspective view showing a biaxial rotation mechanism.

A digital camera 1 according to an embodiment of the present invention will be described below with reference to the accompanying drawings. FIG. 1 is a perspective view showing a digital camera 1. FIG. 2 is a partially cutaway view of the digital camera 1. FIG. 3 is a plan view of the digital camera 1 in which a lid part 3d is omitted. FIG. 4 is a pattern view showing a positioning part 53. FIG. 5A is a side view showing a manner of engaging a stopper pin 53c with a first stopper groove 53a. FIG. 5b is a side view showing a manner of engaging the stopper pin 53c with a second stopper groove 53b. FIG. 6 is a perspective view showing a biaxial rotation mechanism 6.

The digital camera 1 according to the embodiment includes a camera body 2 having an imaging lens 2a and a shutter button 2b, an electronic display (not shown) displaying an image to be picked up through the imaging lens 2a, and an electronic view finder 3. The electronic display is a liquid-crystal display (including LCOS), an organic EL display, or the like.

The electronic view finder 3 can be stored in the camera body 2 and protrudes from the camera body 2 in a photographing state. The electronic view finder 3 includes an eyepiece lens 4 and an image display part (not shown) displaying an image to be picked up. A user visually checks the image to be picked up displayed on the image display part through the eyepiece lens 4. The camera body 2 and the electronic view finder 3 are electrically connected to each other by wires (not shown).

A projecting part 3b is formed on a front surface 3a of the electronic view finder 3. The user can vertically move the electronic view finder 3 while nipping the projecting part 3b.

A lid part 3d is formed on a side surface 3c of the electronic view finder 3. The lid part 3d projects from the side surface 3c of the electronic view finder 3 and is arranged above a support part 51 and a cylindrical part 52 (will be described later) in a planar view.

The digital camera 1 includes a guide mechanism 50 guiding vertical movement of the electronic view finder 3 and a biaxial rotation mechanism 60 which can rotate the electronic view finder 3 depending on a vertical screen position or a horizontal screen position of the digital camera 1.

The guide mechanism 50 includes the support part 51, the cylindrical part 52, and a positioning part 53.

The support part 51 is formed in a columnar shape and has a length set depending on a vertical moving distance of the electronic view finder 3. When a tapered part 54 obtained by chamfering the distal end of the support part 51 in a tapered shape, the support part 51 elastically transforms the stopper pin 53c to make it possible to smoothly insert the support part 51 into the cylindrical part 52 when the support part 51 is attached to the cylindrical part 52.

The cylindrical part 52 is formed substantially in a cylindrical shape and has a length which is substantially two times the vertical movement distance of the electronic view finder 3. A cutout 52*a* is formed in the upper part of the cylindrical part 52. The cutout 52*a* is formed to prevent a connecting part 61 (will be described later) from being interfered while the connecting part 61 moves. A cutout 52*b* having a size depending on the diameter of a stopper pin 53*c* (will be described later) is formed in the peripheral surface of the cylindrical part 52. The cutout 52*b* is formed by using a key sheet cutter or the like.

The positioning part 53 includes a first stopper groove 53*a* obtained by carving the upper peripheral surface of the support part 51, a second stopper groove 53*b* obtained by carving the lower peripheral surface of the support part 51, and a stopper pin 53*c* formed in the camera body 2.

The first stopper groove 53*a* is carved at a position where the stopper pin 53*c* is brought into contact with the support part 51 at a position (storage position) of the electronic view finder 3 when the electronic view finder 3 is stored in the camera body 2. The first stopper groove 53*a* is formed by cutting out the support part 51 in substantially a rectangular shape in a side view.

The second stopper groove 53*a* is carved at a position where the stopper pin 53*c* is brought into contact with the support part 51 at a position (photographing position) of the electronic view finder 3 when the electronic view finder 3 protrudes from the camera body 2. Thus, the second stopper groove 53*b* is arranged below the first stopper groove 53*a*, and a separation distance between the first stopper groove 53*a* and the second stopper groove 53*b* depends on the vertical movement distance of the electronic view finder 3. The second stopper groove 53*b* is cut out in substantially a rectangular shape in a side view and has an upper part chamfered in a tapered shape.

The stopper pin 53*c* is a piano wire or the like drawn in a horizontal direction and is adhered to the camera body 2 near the cylindrical part 52. The stopper pin 53*c* may be a thing coupled to the camera body 2 by being knocked into the camera body 2. The stopper pin 53*c* can be brought into contact with the support part 51 through the cutout 52*b*. When the stopper pin 53*c* is engaged with the first stopper groove 53*a* or the second stopper groove 53*b* to make it possible to position the support part 51 to the cylindrical part 52.

The radius of the stopper pin 53*c* is set to be larger than the depth of the first stopper groove 53*a* to make it possible to easily cancel the engagement between the stopper pin 53*c* and the first stopper groove 53*a* by vertical external force.

The radius of the stopper pin 53*c* is set to be smaller than the depth of the second stopper groove 53*b*, and the upper part of the first stopper groove 53*b* is formed in a tapered shape, so that the engagement between the stopper pin 53*c* and the second stopper groove 53*b* can be easily canceled by vertical external force. Furthermore, the depth of the second stopper groove 53*b* is set to be larger than the radius of the stopper pin 53*c* to suppress the stopper pin 53*c* from dropping down the second stopper groove 53*b*. A tapered part 54 is formed at the distal end of the support part 51 to make it possible to attach the electronic view finder 3 to the cylindrical part 52 by the connecting part 61 after the electronic view finder 3 is built in the support part 51.

The biaxial rotation mechanism 60 includes the connecting part 61, a first shaft part 62, and a second shaft 63.

The connecting part 61 is formed substantially in an L shape. The connecting part 61 connects the electronic view finder 3 and the support part 51 which are parallel with each other. In this manner, an installation space for a spring arranged below a conventional electronic view finder can be omitted to make it possible to reduce the camera body 2 in size. The connecting part 61 includes a vertical surface part 61*a* and a horizontal surface part 61*b*. Reference numeral 64 denotes a positioning projection which is formed on a side surface 3*c* of the electronic view finder 3 and, when the electronic view finder 3 is stored in the camera body 2 in a state in which an optical axis of the eyepiece lens 4 is aligned to the vertical moving direction of the electronic view finder 3, brought into contact with the connecting part 61 to position the electronic view finder 3 at a predetermined position.

On the vertical surface part 61*a*, a first hole 61*c* into which a first shaft part 62 is inserted is formed. On the horizontal surface part 61*b*, a second hole 61*d* in which a second shaft part 63 is inserted is formed. The vertical surface part 61*a* and the horizontal surface part 61*b* are connected to each other substantially at right angle. The width of the horizontal surface part 61*b* is preferably set to be equal to or smaller than the width of the support part 51. In this manner, the horizontal surface part 61*b* can be suppressed from being interfered with the cylindrical part 52.

The first shaft part 62 pivotally supports the electronic view finder 3 such that the electronic view finder 3 can be rotated with respect to the connecting part 61. A rotation shaft A of the first shaft part 62 is set to be parallel with the longitudinal direction of the camera body 2. A direction in which the electronic view finder 3 is clockwise rotated when viewed from the axial line of the first shaft part 62 is called a "first direction" hereinafter. Reference numeral 65 denotes a counter-rotation restriction part receiving and restricting counter rotation of the electronic view finder 3 in the first direction.

The second shaft part 63 pivotally supports the connecting part 61 such that the connecting part 61 can be rotated with respect to the support part 51. A rotating shaft B of the second rotating or second shaft part 63 is set to be parallel with the short direction of the camera body 2. A direction in which the connecting part 61 is clockwise rotated when viewed from the axial line of the second shaft part 63 is called a "second direction" hereinafter. Reference numeral 66 is an over-rotation restriction part restricting a rotation range of the connecting part 61 in the second direction.

Figure 7:
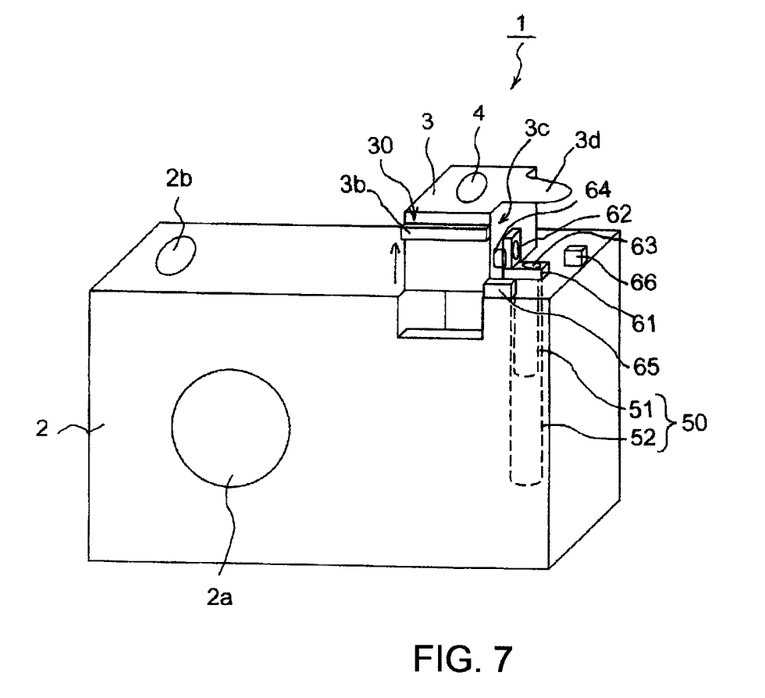
FIG. 7 is a perspective view showing a state in which the electronic view finder moves upward.
Figure 8:
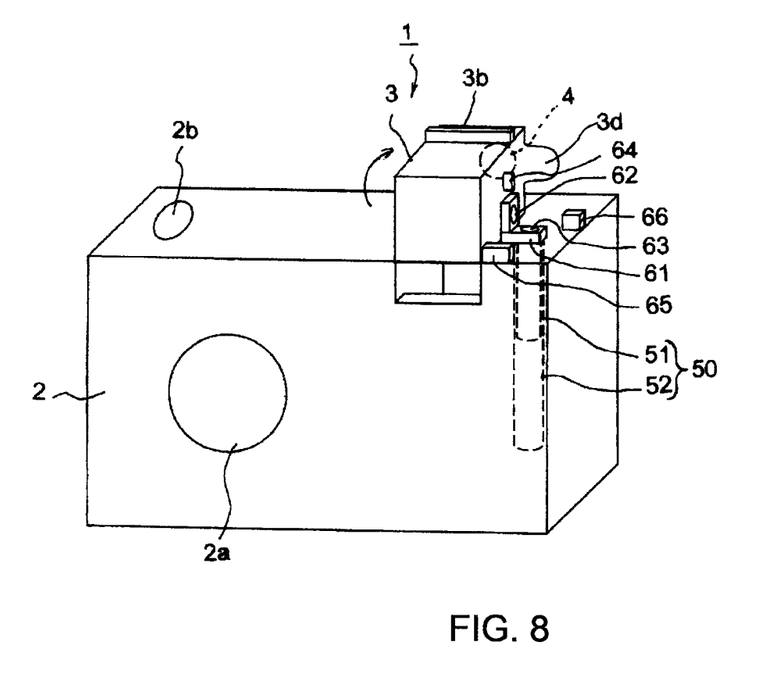
FIG. 8 is a perspective view showing in a state in which the electronic view finder in FIG. 7 is rotated around a first shaft part.
Figure 9:
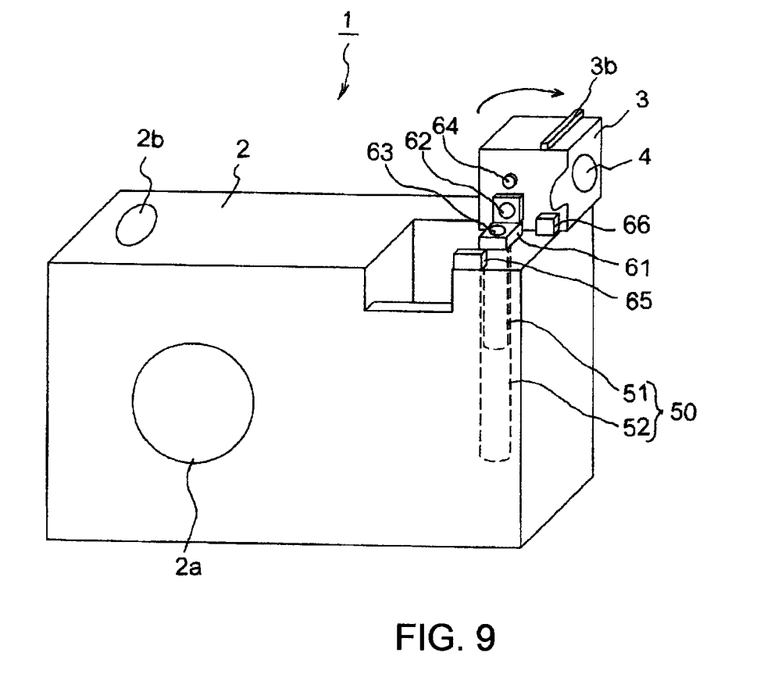
FIG. 9 is a perspective view showing a state in which the connecting part in FIG. 8 is rotated around the second shaft part.

An operation of the electronic view finder 3 will be described below with reference to the accompanying drawings. FIG. 7 is a perspective view showing a state in which the electronic view finder 3 moves upward. FIG. 8 is a perspective view showing a state in which the electronic view finder 3 is rotated around the first shaft part 62. FIG. 9 is a perspective view showing a state in which the connecting part 61 is rotated around the second shaft part 63.

As shown in FIG. 1, in the electronic view finder stored in the camera body 2, a lid part 3*d* of the electronic view finder 3 closes the upper parts of the support part 51 and the cylindrical part 52. While the electronic view finder 3 is stored in the camera body 2, the stopper pin 53*c* is engaged with the first stopper groove 53*a* to prevent the electronic view finder 3 from unexpectedly jumping out.

When the electronic view finder 3 and the support part 51 move upward, as shown in FIG. 7, the electronic view finder 3 projects from the camera body 2. Since the support part 51 is surrounded by the cylindrical part 52, horizontal movement of the electronic view finder 3 is restricted while the electronic view finder 3 moves upward. When the electronic view finder 3 moves upward by a predetermined distance, the stopper pin 53c is engaged with the stopper groove 53b to position the electronic view finder 3 at a photographing position.

As shown in FIG. 8, when the electronic view finder 3 rotates substantially by 90 degrees in the first direction, the electronic view finder 3 is brought into contact with the camera body 2, and the optical axis of the imaging lens 2a is parallel with the optical axis of the eyepiece lens 4 to cause the electronic view finder 3 to cope with the horizontal screen position of the digital camera 1. Rotation of the electronic view finder 3 in a direction opposite to the first direction is suppressed by the counter-rotation restriction part 65.

As shown in FIG. 9, when the electronic view finder 3 and the connecting part 61 rotate substantially by 90 degrees in the second direction, the electronic view finder 3 is brought into contact with the over-rotation restriction part 66, and the optical axis of the imaging lens 2a is substantially perpendicular to the optical axis of the eyepiece lens 4 to cause the electronic view finder 3 to cope with the vertical screen position of the digital camera 1.

As described above, in the digital camera 1 according to the embodiment, a guide mechanism 50 can guide vertical movement of the electronic view finder 3, and a biaxial rotation mechanism 60 can arbitrarily rotate the electronic view finder 3 around the first shaft part 62 or the second shaft part 63. More specifically, the electronic view finder 3 rotates relatively to the connecting part 61 in the first direction to make it possible to cause the electronic view finder 3 to cope with a horizontal screen position. The connecting part 61 rotates relatively to the guide mechanism 50 in the second direction to make it possible to cause the electronic view finder 3 to cope with a vertical screen position.

Since the support part 51 connected to the electronic view finder 3 is stored in the cylindrical part 52 in a nesting structure to restrict horizontal displacement of the support part 51 when the electronic view finder 3 moves upward, the electronic view finder 3 can be accurately moved upward.

Furthermore, the stopper pin 53c is engaged with the first stopper groove 53a or the second stopper groove 53b to make it possible to arbitrarily position the electronic view finder 3 at a storage position and a photographing position.

In the embodiment described above, the rotating axis of the first shaft part 62 is set to be parallel with the longitudinal direction of the camera body 2, and the rotating axis of the second shaft part 63 is set to be parallel with the short direction of the camera body 2. However, the invention is not limited to the structure, and the invention may include a structure in which the electronic view finder 3 is rotated around a rotating axis parallel with the short direction of the camera body 2 and the connecting part 61 is rotated around a rotating axis parallel with the longitudinal direction of the camera body 2.

The rotating angles of the electronic view finder 3 and the connecting part 61 are not limited to 90 degrees, for example, may be 80 degrees or 100 degrees.

Various modifications of the present invention are effected without departing from the spirit and scope of the invention. The present invention includes the modifications, as a matter of course.

REFERENCE NUMERALS

1 . . . digital camera
2 . . . camera body
2a . . . imaging lens
2b . . . shutter button
3 . . . electronic view finder
3a . . . front surface
3b . . . projection
3c . . . side surface
3d . . . lid part
4 . . . eyepiece lens
50 . . . guide mechanism
51 . . . support part
52 . . . cylindrical part
52a . . . cutout
53 . . . positioning part
53a . . . first stopper groove
53b . . . second stopper groove
53c . . . stopper pin
54 . . . tapered part
60 . . . biaxial rotation mechanism
61 . . . connecting part
61a . . . vertical surface part
61b . . . horizontal surface part
61c . . . first hole
61d . . . second hole
62 . . . first shaft part
63 . . . second shaft part
64 . . . positioning projection
65 . . . counter-rotation restriction part
66 . . . over-rotation restriction part
A . . . rotating shaft (of first shaft part)
B . . . rotating shaft (of second shaft part)

What is claimed is:

1. A digital camera which includes a camera body having an imaging lens and electronic view finder which can be stored in the camera body such that the electronic view finder can be vertically moved and causes a user to observe an image to be picked up, comprising:
 a guide mechanism guides vertical movement of the electronic view finder and
 a biaxial rotation mechanism having a connecting part connecting the electronic view finder and the guide mechanism to each other, a first shaft part supporting the electronic view finder such that the electronic view finder can be rotated around a first direction with respect to the connecting part, and a second shaft part supporting the connecting part such that the connecting part can be rotated around a second direction vertical to the first direction with respect to the guide mechanism.

2. The digital camera according to claim 1, wherein the guide mechanism includes,
 a support part connected to the electronic view finder through the connecting part,
 a cylindrical part disposed in the camera body and storing the support part in a nesting structure such that the support part can be vertically moved, and
 a positioning part can position the support part depending on a storage position where the electronic view finder is stored in the camera body or a photographing position where the electronic view finder projects from the camera body.

3. The digital camera according to claim 2, wherein the positioning part includes,
 a first stopper groove carved in a peripheral surface of the support part depending on the storage position,
 a second stopper carved in the peripheral part depending on the photographing position, and
 a stopper pin which can be engaged with the first stopper groove or the second stopper groove.

4. The digital camera according to claim 1, comprising a counter-rotation restriction part restricting counter rotation of the electronic view finder in the first direction.

5. The digital camera according to claim 1, comprising an over-rotation restriction part restricting a rotation range of the connecting part in the second direction.

6. The digital camera according to claim 1, wherein
the connecting part is obtained such that a vertical surface part in which a first hole into which the first shaft part is inserted is formed and which faces the electronic view finder and a horizontal surface part in which a second hole into which the second shaft part is inserted is formed and which faces the support part are arranged substantially in an L shape.

7. A digital camera comprising:
a camera body;
an electronic view finder stored within said camera body;
a vertical guide mechanism coupled to said camera body and said electronic view finder, whereby said electronic view finder is capable of vertically extending in and raising from said camera body; and
a biaxial rotation mechanism having a first shaft part with a first axis of rotation in a first direction rotatably coupled to said electronic view finder and a second shaft part with a second axis of rotation in a second direction rotatably coupled to said vertical guide mechanism, wherein the first axis of rotation and the second axis of rotation are perpendicular, whereby said electronic view finder is capable of being vertically and horizontally rotated.

\* \* \* \* \*